(12) United States Patent
Helenowski

(10) Patent No.: US 7,334,307 B1
(45) Date of Patent: Feb. 26, 2008

(54) DISPOSABLE SET SCREW SYSTEM

(76) Inventor: Tomasz K Helenowski, 936 Burnham Ct., Glenview, IL (US) 60025-4140

( * ) Notice: Subject to any disclaimer, the term of this patent is extended or adjusted under 35 U.S.C. 154(b) by 0 days.

(21) Appl. No.: 11/439,798

(22) Filed: May 23, 2006

(51) Int. Cl.
*B25B 27/14* (2006.01)
*B23Q 1/00* (2006.01)
(52) U.S. Cl. ............... 29/281.1; 269/289 R; 269/302.1
(58) Field of Classification Search ............... 28/281.1; 269/43, 289 R, 900, 291
See application file for complete search history.

(56) References Cited

U.S. PATENT DOCUMENTS

| | | | |
|---|---|---|---|
| 3,880,416 A * | 4/1975 | Horwitz | .................. 269/152 |
| 4,492,500 A | 1/1985 | Ewing | |
| 4,627,774 A | 12/1986 | Bradley | |
| 4,666,354 A | 5/1987 | Hepworth | |
| 5,098,241 A | 3/1992 | Aldridge et al. | |
| 5,584,625 A | 12/1996 | Petri | |
| 5,653,011 A * | 8/1997 | Collins | .................. 29/281.4 |
| 5,711,195 A * | 1/1998 | Koelling | .................. 82/1.11 |
| 5,816,568 A * | 10/1998 | Fox | .................. 269/60 |
| 6,042,430 A | 3/2000 | Hollick | |
| 6,176,659 B1 | 1/2001 | Hardt | |
| 6,254,141 B1 | 7/2001 | Piper | |
| 6,302,887 B1 | 10/2001 | Spranza et al. | |
| 6,309,158 B1 | 10/2001 | Bellinghausen et al. | |
| 6,338,477 B1 * | 1/2002 | Moore | .................. 269/60 |
| 6,346,114 B1 | 2/2002 | Schraga | |
| 6,537,005 B1 | 3/2003 | Denham | |
| 6,578,246 B2 * | 6/2003 | Chen | .................. 29/239 |

FOREIGN PATENT DOCUMENTS

| | | |
|---|---|---|
| DE | 4.113.242 | 10/1992 |
| EP | 0.634.811 | 1/1995 |
| EP | 0.602.643 | 1/1996 |
| EP | 0.984.176 | 3/2000 |
| EP | 1.460.278 | 9/2004 |
| FR | 2.760.495 | 9/1998 |
| JP | 8232931 | 9/1996 |

* cited by examiner

*Primary Examiner*—Lee D. Wilson
(74) *Attorney, Agent, or Firm*—Michael I. Kroll

(57) ABSTRACT

A disposable set screw system which comprises inserting the set screw to the desired depth, removing the excess shank portion, and multiple methods for removal of the set screw when desired that in turn improves efficiencies over fixture setup of prior art.

5 Claims, 14 Drawing Sheets

DISPOSABLE SET SCREW SYSTEM

BACKGROUND OF THE INVENTION

1. Field of the Invention

Figure 1:
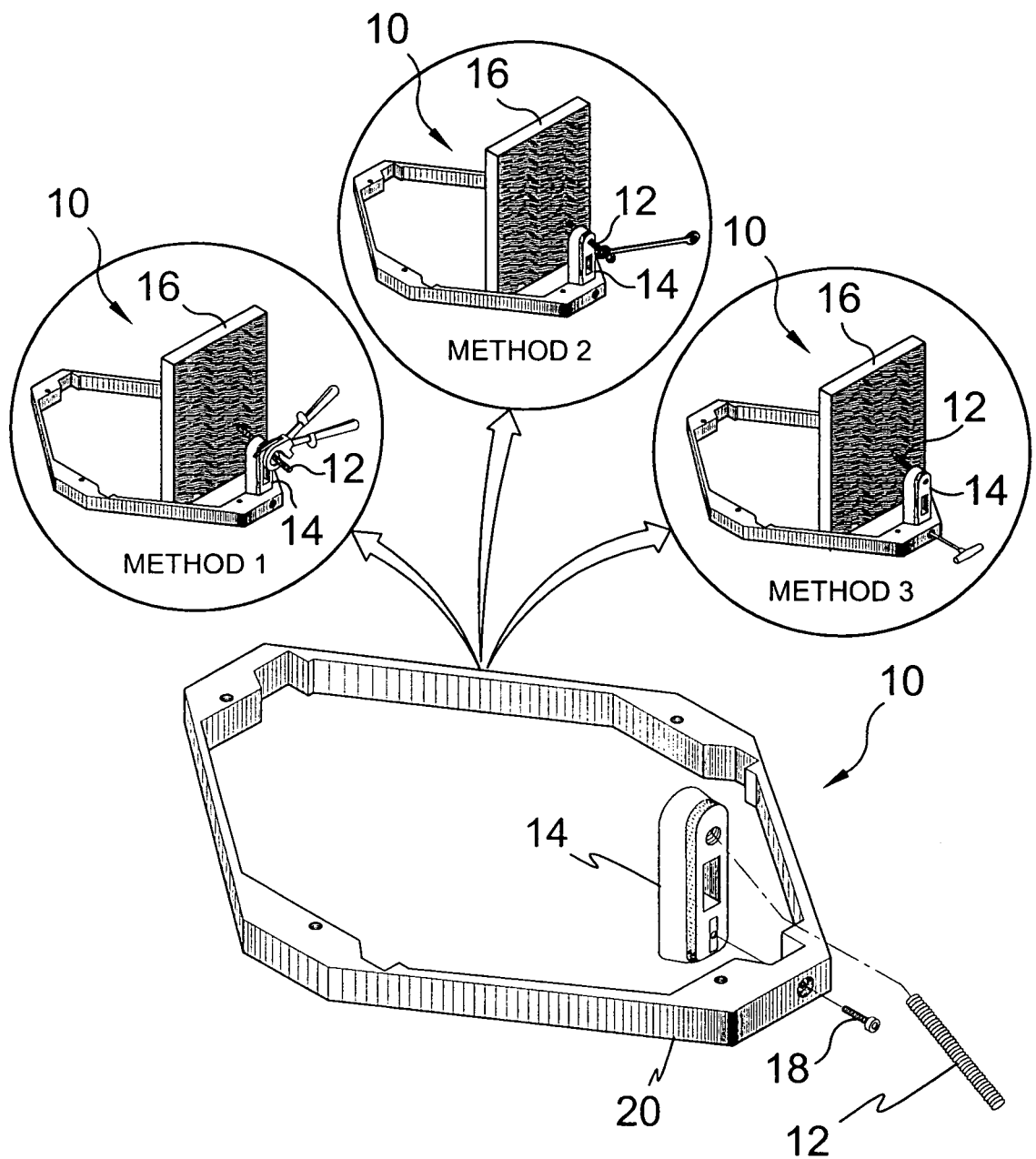

The present invention relates generally to a fastening system and, more specifically, to a disposable set screw system which comprises inserting the set screw to the desired depth, removing the excess shank portion, and means for removal of the set screw when desired.

The present invention includes a disposable set screw that is longer in length than needed to secure an object within a fixture or the like. The set screw transverses inward toward the object until the distal end of the set screw reaches the object to be held and the object is held securely within the fixture. The excess shank of the set screw is then sheared with a cutting tool to eliminate any interference with form, fit and operation of the fixture.

In prior art, improper selection of shank length (too long or short) results in the need to remove and reselection of the set screw. In turn, efficiencies in the setup process are reduced. The method of the present invention eliminates the need to select a set screw of proper length for any given application The disposable set screw system of the present invention provides means for three methods to remove the disposable set screw and release the pressure of the object within the fixture.

In one method, the supporting member for the set screw is held to the fixture with an adjacent anchoring screw. When the adjacent anchoring screw is removed, the supporting member is released and the pressure between the object and the disposable set screw is eliminated. In turn the shank of the set screw with no binding pressure can easily be turned for removal.

In another method, an internally threaded reducer with an end that is adapted for a wrench or like tool is used in the supporting member. The set screw is inserted and tightened through the internally threaded reducer and cut off. In turn, the threaded reducer and set screw are secured together. When the set screw needs to be removed, the threaded reducer is unscrewed and the disposable set screw comes with it.

In a third method for releasing the set screw, a hex nut or a pair of hex nuts, or the like are placed on the set screw prior to being cut off. By threading the two nuts together, the binding of the nuts locks the two nuts together and allows of easy removal of the disposable set screw.

2. Description of the Prior Art

There are other methods for means of fastening. Typical of these is U.S. Pat. No. 4,627,774 issued to Bradley on Dec. 9, 1986.

Another patent was issued to Hepworth; Paul S. on May 19, 1987 as U.S. Pat. No. 4,666,354. Yet another U.S. Pat. No. 5,584,625 was issued to Petri; Manfred on Dec. 17, 1996 and still yet another was issued on Mar. 28, 2000 to Hollick; David John as U.S. Pat. No. 6,042,430. Another patent was issued to Hardt; Falk on Jan. 23, 2001 as U.S. Pat. No. 6,176,659.

Internationally, a German Patent No. DE 4113242 was issued to Czernek, Georg on Oct. 29, 1992. Another European patent was issued to Klehe, Armin on Jan. 18, 1995 as EP 0634811 and still yet another was issued on Jan. 17, 1996 to Limanin as Patent No. EP 0692643.

Another European patent was issued to Hardt Falk, Dipling on Mar. 8, 2000 as Patent No. EP 0984176. Yet another European Patent No. EP 1460278 was issued to Frank, Erich on Sep. 22, 2004. Another patent was issued to Pasukaru, Detaaburu on Sep. 10, 1996 as Japan Patent JP 8232931. Another patent was issued to Burguburu, Philippe on Sep. 11, 1998 as Fransce. Patent No. FR 2760495.

U.S. Pat. No. 4,627,774

Inventor: Bradley; Earl T.

Issued: Dec. 9, 1986

A limited torque bolt-nut assembly including a bolt shank having a threaded first end portion and a non-threaded second end portion, a secondary drive head on the second shank portion and a primary shearable drive head on the secondary drive head, and a hollow nut secured over both drive heads and a portion of the non-threaded shank section. The hollow nut drives the primary drive head which rotates relative to the secondary drive head until the primary drive head shears off at a predetermined torque releasing the nut and primary drive head. The secondary drive head remains on the bolt shank for adjustment and removal of the bolt.

U.S. Pat. No. 4,666,354

Inventor: Hepworth; Paul S.

Issued: May 19, 1987

The disclosure concerns a fixing device for securing fasteners such as bolts into concrete or other similar material. The device comprises a sleeve member having a block portion in which a nut is set. The block portion has a frusto-conical extension portion joined by shearable links to an intermediate portion of the member which has an internal frusto-conical surface complementing the extrusion portion of the block portion. Tightening the bolt shears the links in the usual way. According to the present invention the device is moulded in two longitudinally divided portions and, hinged together by a plastics hinge adjacent the block portion. In the as-moulded conditions the portions are arranged end-to-end, but are hinged together to form the device ready for use.

U.S. Pat. No. 5,584,625

Inventor: Petri; Manfred

Issued: Dec. 17, 1996

The present invention is directed to a bolt with shearable head with an external thread section, a head section and a taper section forming a predetermined breakage point, provided for between the external thread section and the head section, as well as an end section providing a clamping contact. Furthermore, there is provided a threaded bush, extending at least partly along the external thread section and having in turn an external thread.

U.S. Pat. No. 6,042,430

Inventor: Hollick; David John

Issued: Mar. 28, 2000

A shearable fastener has a threaded shank adapted for engagement with a threaded bore and a head formed for engagement with a drive tool. The shank is formed with a series of axially separated weakenings defining a series of shear planes, the weakenings being formed such that the applied torque necessary to cause the shank to shear increases progressively from the shear plane furthest from the head to the shear plane nearest the head.

U.S. Pat. No. 6,176,659

Inventor: Hardt; Falk

Issued: Jan. 23, 2001

The present invention relates to a tear-off cap or shearable screw comprising a plurality of thread portions and a cap portion connected with the thread portions via a first predetermined breaking point, wherein further predetermined breaking points in the form of cross-section tapering are provided between the thread portions. The present invention distinguishes itself by the fact that the tear-off torques both increase and decrease from the most remote thread portion towards the cap portion, this forming at least one stepped predetermined breaking point.

German Patent Number DE 4113242

Inventor: Czernek, Georg

Issued: Oct. 29, 1992

A smaller head is joined to a larger externally-threaded body by a narrow neck through which the bore for a tightening tool of hexagonal cross-section extends down to the body. The tightening torque is limited by a circumferential groove at which the head and neck are sheared off when the limit is exceeded. A protrusion from a recess into the bore restricts insertion of the tool. ADVANTAGE—Esp. effective and highly reliable bolt is easily mfd. and its body can be unscrewed after the head has been sheared.

European Patent Number EP 0634811

Inventor: Klehe, Armin

Issued: Jan. 18, 1995

A shear bolt screw having a threaded body with an external thread as well as a tear-off head having an engagement surface for a tool. A transitional region is located between the threaded body and the tear-off head. This transitional region has a smaller external diameter than the threaded body and the tear-off head. The transitional region tapers from the tear-off head to the threaded body in an increasing manner, and ends in a shear groove running in the circumferential direction. The latter is located deeper than the upper end of the threaded body facing the tear-off head. The fracture surface which is produced in the region of the shear groove thus does not present any problems during further handling.

European Patent Number EP 0692643

Inventor: Limanin

Issued: Jan. 17, 1996

The break-off screw has a threaded section and a head section separably fixed to it via an intended break point. At least one further threaded section and a further intended break point are provided. The threaded sections are connected to one another via the second intended break point. The break-off torque and torque areas leading to the separations at the individual intended break points have a varying extent increasing in particular from the head section to the last threaded section or connecting to each other. An inner recess extends from the head section to the foremost threaded section.

European Patent Number EP 0984176

Inventor: Hardt Falk, Dipling

Issued: Mar. 8, 2000

The bolt has several thread sections and a head section. This is connected to the threaded sections via a first preferred breakage point, and further preferred breakage points between the thread sections, in the form of cross-sectional narrowings. The breaking torque both increases and decreases from the furthest thread section to the head section, so that at least one staged preferred breakage point is formed.

European Patent Number EP 1460278

Inventor: Frank, Erich

Issued: Sep. 22, 2004

The screw has a head region with a tool-engagement surface, and a threaded region with an outer thread and a hole. The thickness of the wall formed between the hole and the outer thread continuously increases from the end furthest from the head region to the end proximate the head region, at least over part of the axial extent. An Independent claim is included for a device for screw-connecting electrical wires, in particular, a screw connection terminal.

Japan Patent Number JP 8232931

Inventor: Pasukaru, Detaaburu

Issued: Sep. 10, 1996

PROBLEM TO BE SOLVED: To prevent the falling the first head of a screw after shearing and collect it. SOLUTION: A cylindrical bearing face having an outer diameter not smaller than the outer diameter of a neck but smaller than the outer diameter of a second head is provided between the shearable neck and the second head. A screw tightening tool is constructed by a tightening end strip and a rotation driving means, the end strip being formed as a tubular body. An elastic means is provided between the connection of the tubular body connectable to the first head and the first end and it is radially protruded into the tubular body in a free condition, so that the first head of the screw can be inserted into the connection after setting-in and the first head, when put in the connection, be locked in cooperation with the cylindrical bearing face of the screw. A storage room for storing the first head is provided in communication with the connection.

France Patent Number FR 2760495

Inventor: Burguburu Philippe

Issued: Sep. 11, 1998

A fastening for two components consists of a nut engaging with a stud which is fixed to one component and passes through a hole in the other. The nut has a hexagonal head and a neck which is designed to shear at a given force, breaking off the top of the nut when the correct torque has been applied to it. The nut body can have a hexagonal section to allow it to be dismantled, and it has an annular groove to receive a cover once the head has been removed.

While these fastening devices and systems may be suitable for the purposes for which they were designed, they would not be as suitable for the purposes of the present invention, as hereinafter described.

SUMMARY OF THE PRESENT INVENTION

A primary object of the present invention is to provide a disposable set screw system which comprises inserting the set screw to the desired depth, removing the excess shank portion, and means for removal of the set screw when desired.

Another object of the present invention is to provide a disposable set screw system that utilizes a disposable set screw that is intentionally longer in length than needed.

Yet another object of the present invention is to provide a disposable set screw system that secures an object to a fixture.

Another object of the present invention is to provide a disposable set screw system that improves the efficiencies of fixture setup time.

Still yet another object of the present invention is to provide a disposable set screw system that is not to interfere with the form, fit, operations, or processes the fixture assembly will go through.

Yet another object of the present invention is to provide a disposable set screw system that allows for three methods of secondary release that facilitates the removal of said disposable set screw.

Still yet another object of the present invention is to provide a disposable set screw system that utilizes an adjacent anchoring screw as an secondary release mechanism to facilitate the of removal of said disposable set screw.

Another object of the present invention is to provide a disposable set screw system that utilizes an internally threaded reducer with a distal end that is adapted for a wrench or like tool as a secondary release mechanism to facilitate the of removal of said disposable set screw.

Another object of the present invention is to provide a disposable set screw system that utilizes a hex nut or a pair of hex nuts, or the like that are used as a secondary release mechanism to facilitate the of removal of said disposable set screw.

Additional objects of the present invention will appear as the description proceeds.

The present invention overcomes the shortcomings of the prior art by providing a disposable set screw system which comprises inserting the set screw to the desired depth, removing the excess shank portion, and multiple methods for removal of the set screw when desired that in turn improves efficiencies over fixture setup of prior art.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
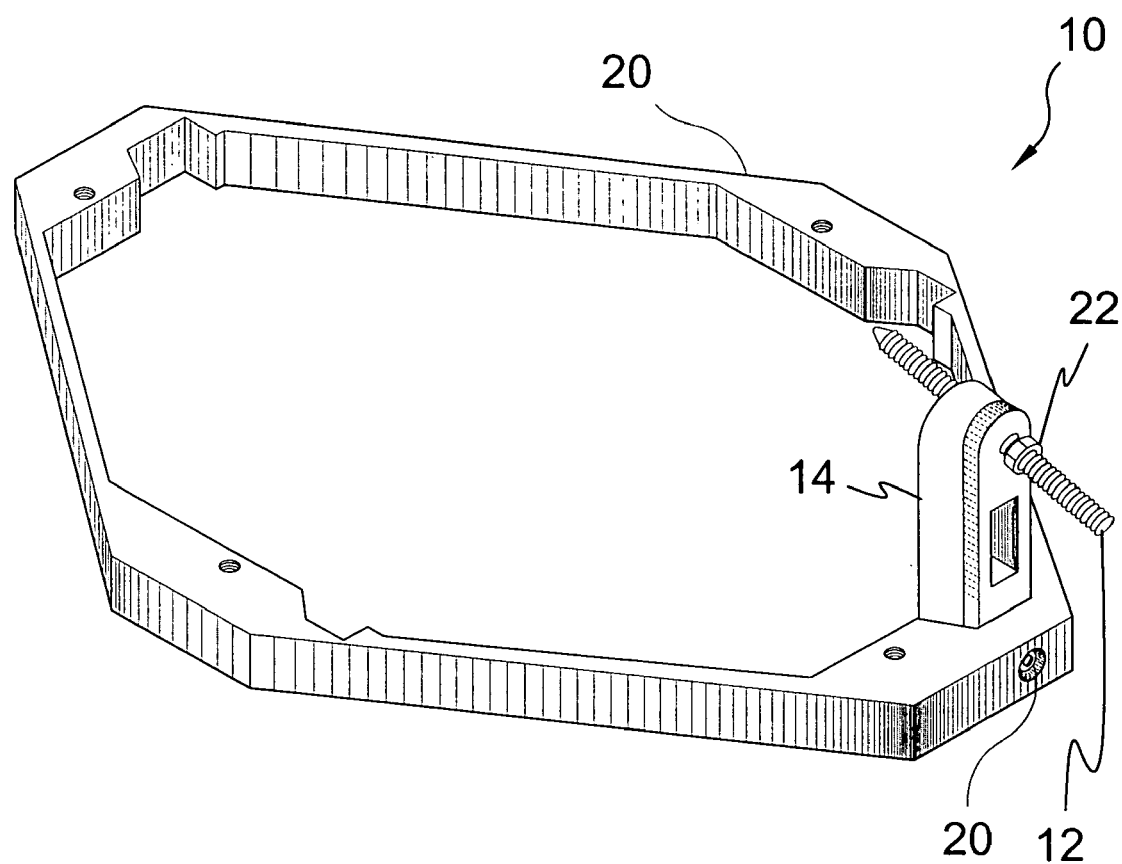
Figure 3:
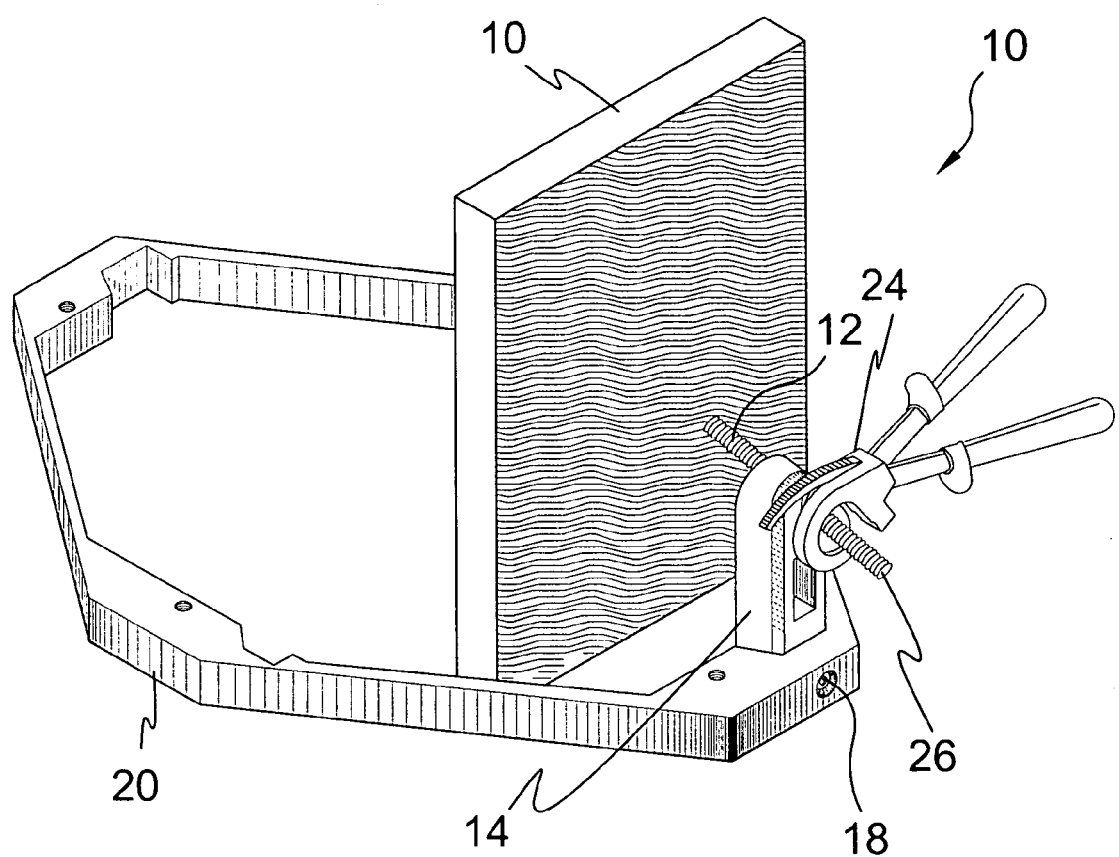
Figure 4:
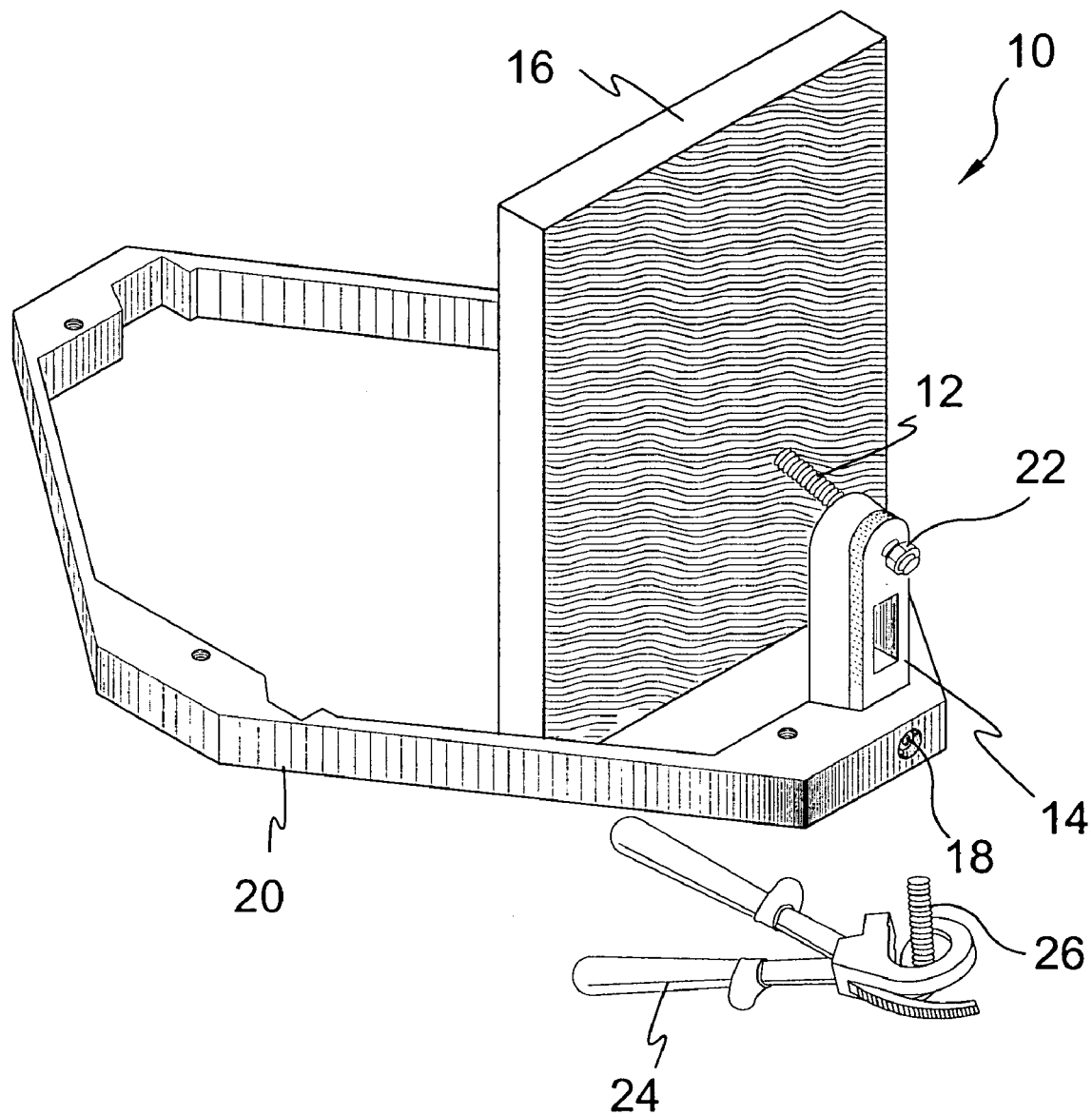
Figure 5:
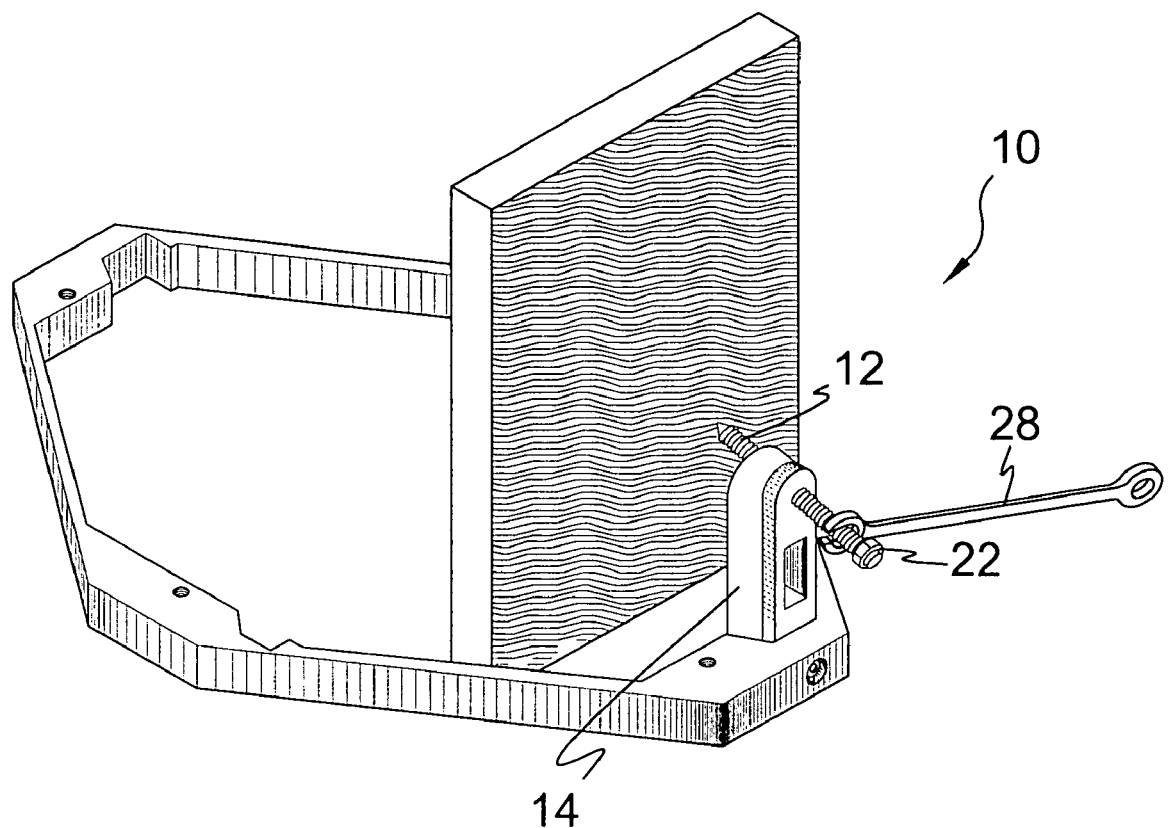
Figure 6:
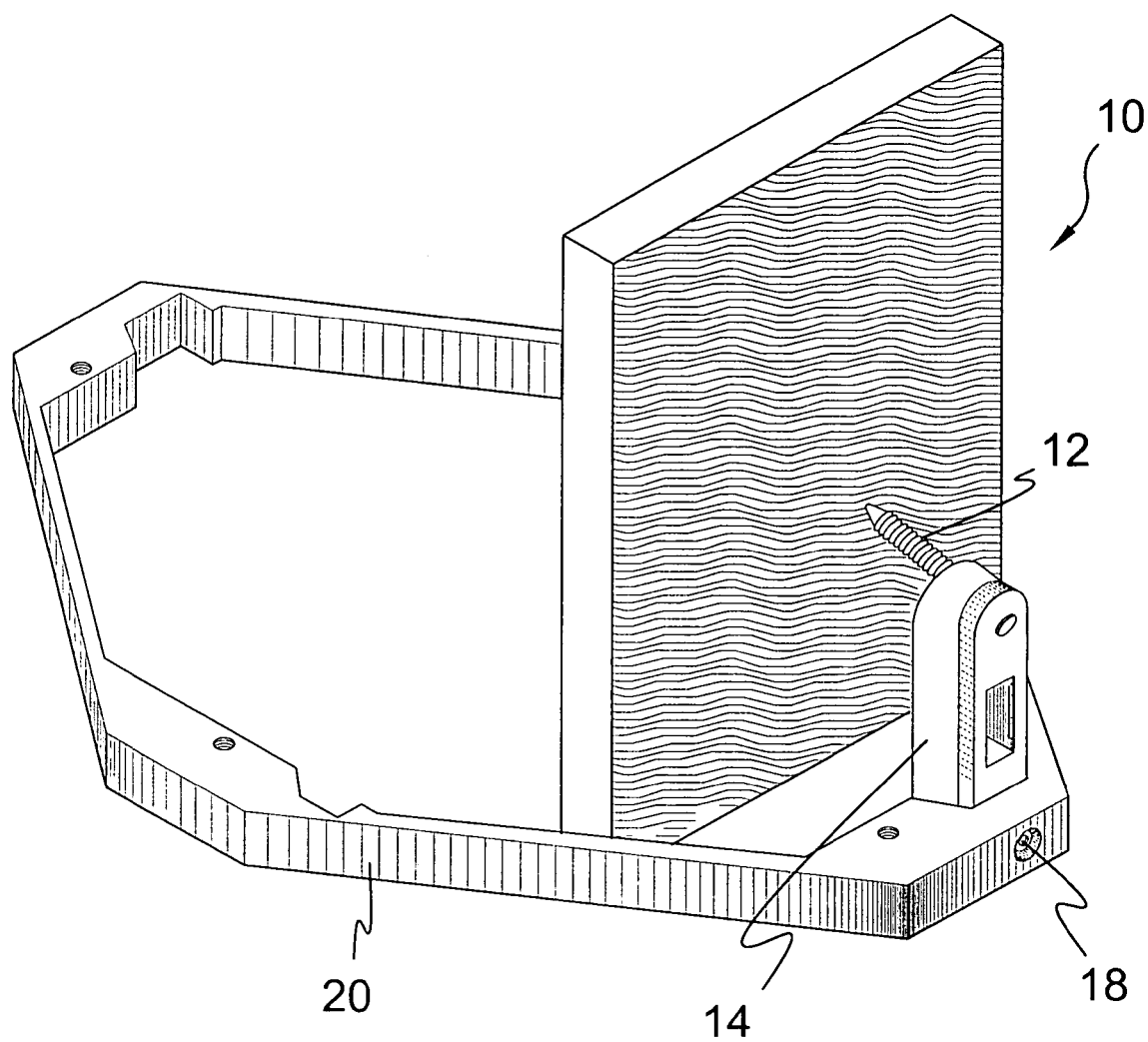
Figure 7:
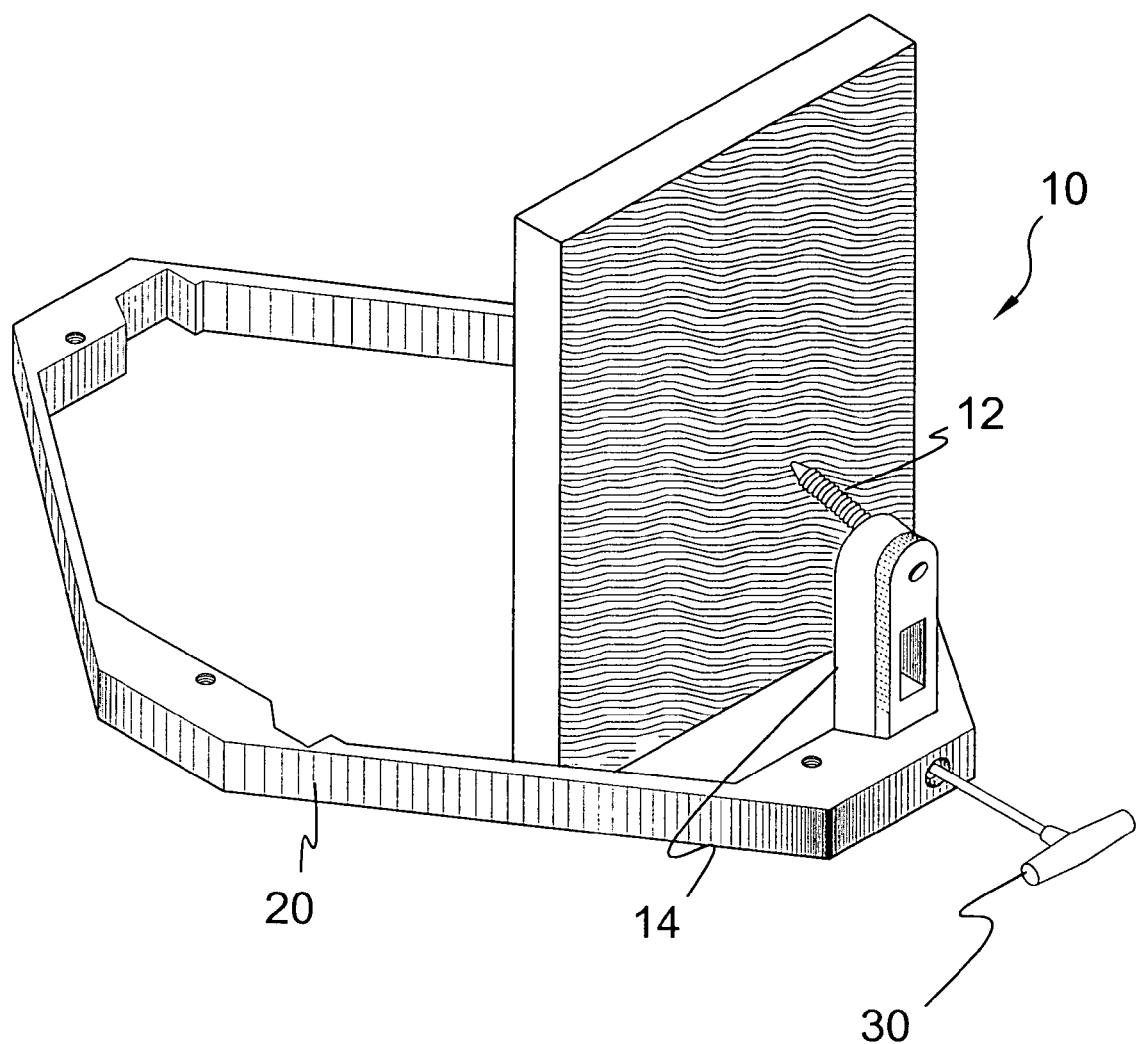
Figure 8:
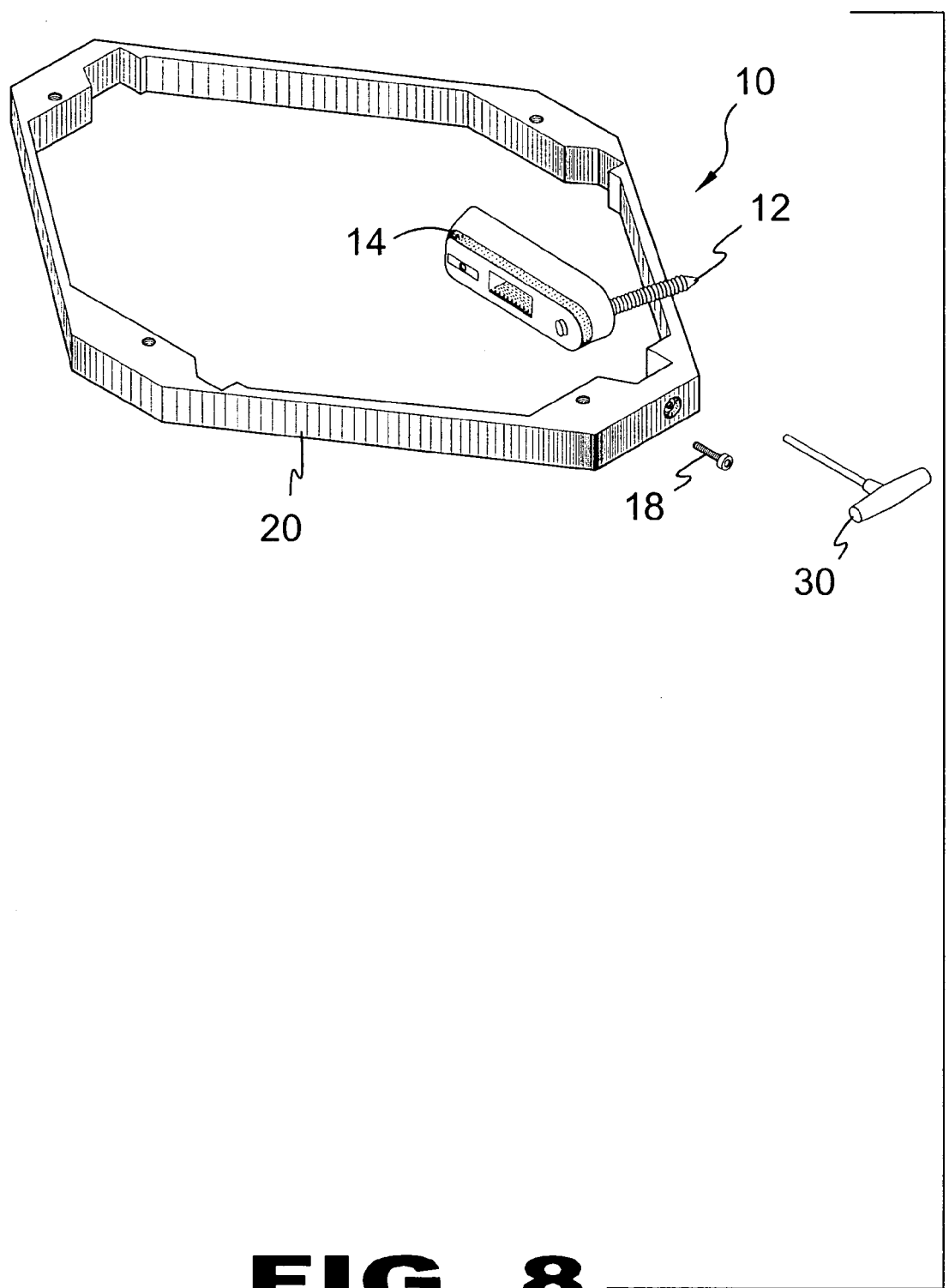
Figure 9:
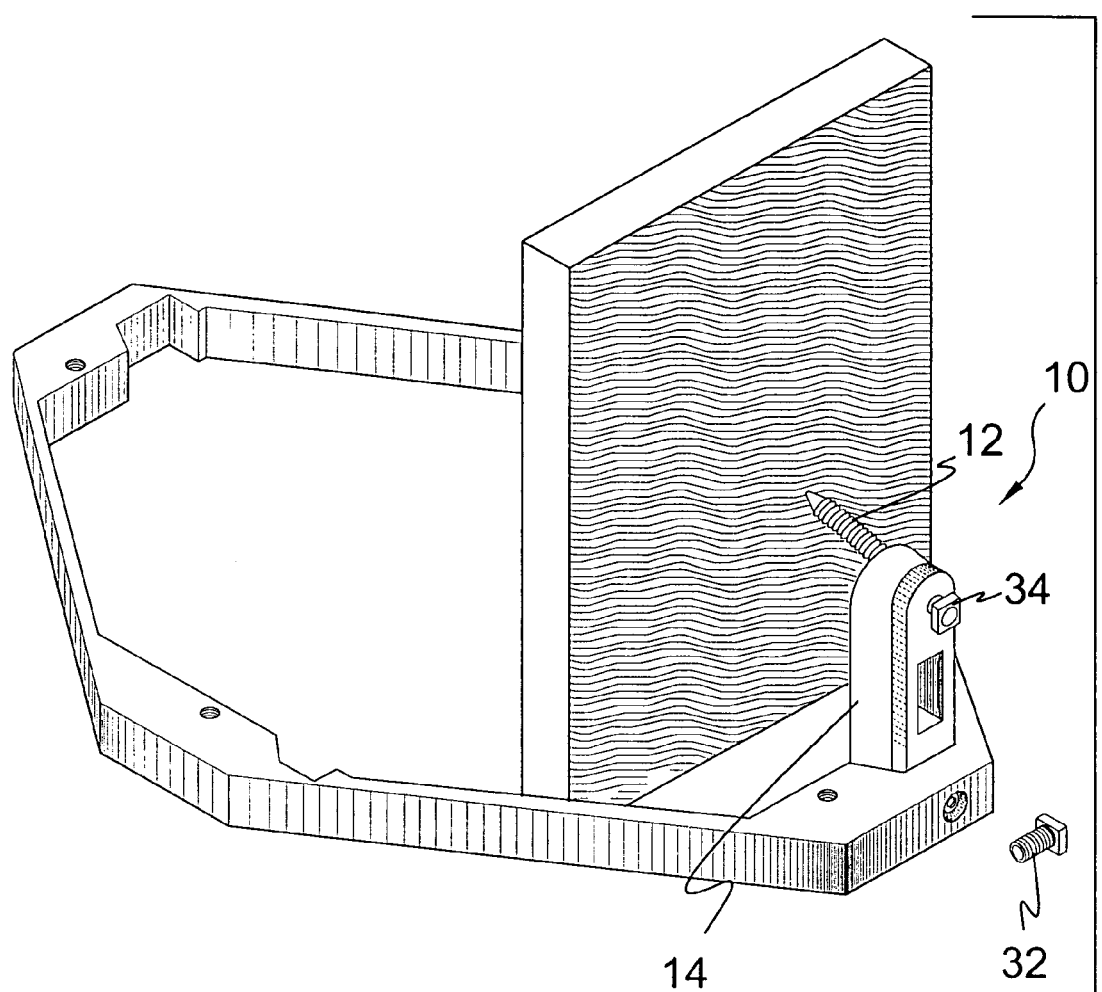
Figure 10:
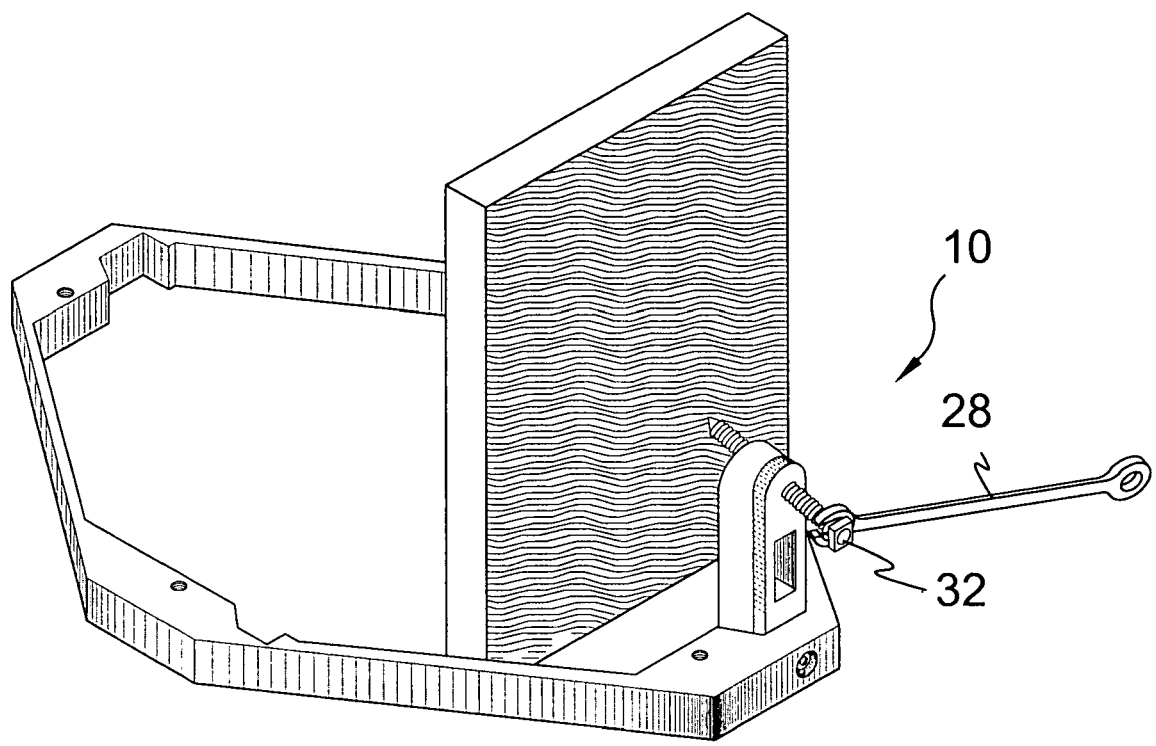
Figure 11:
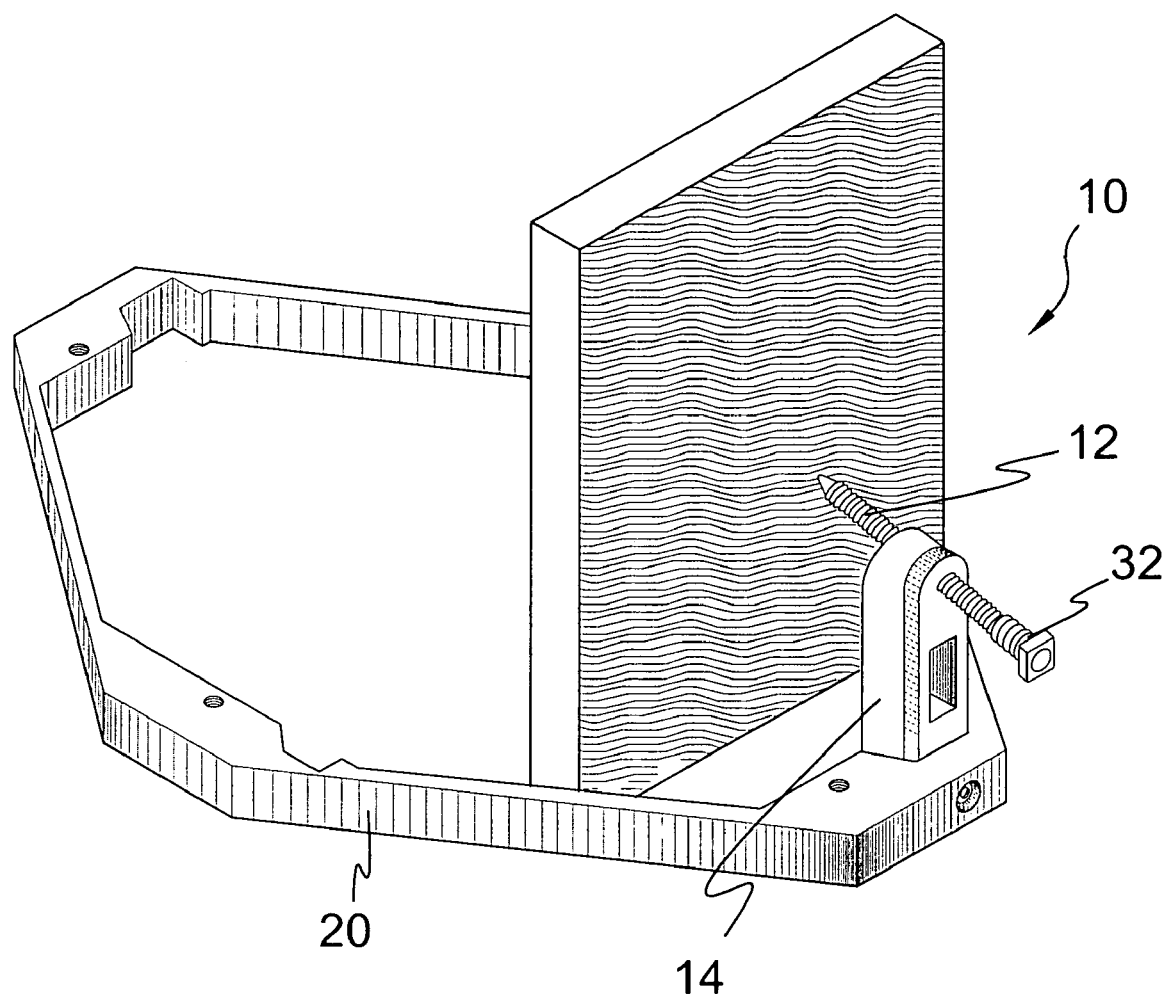
Figure 12:
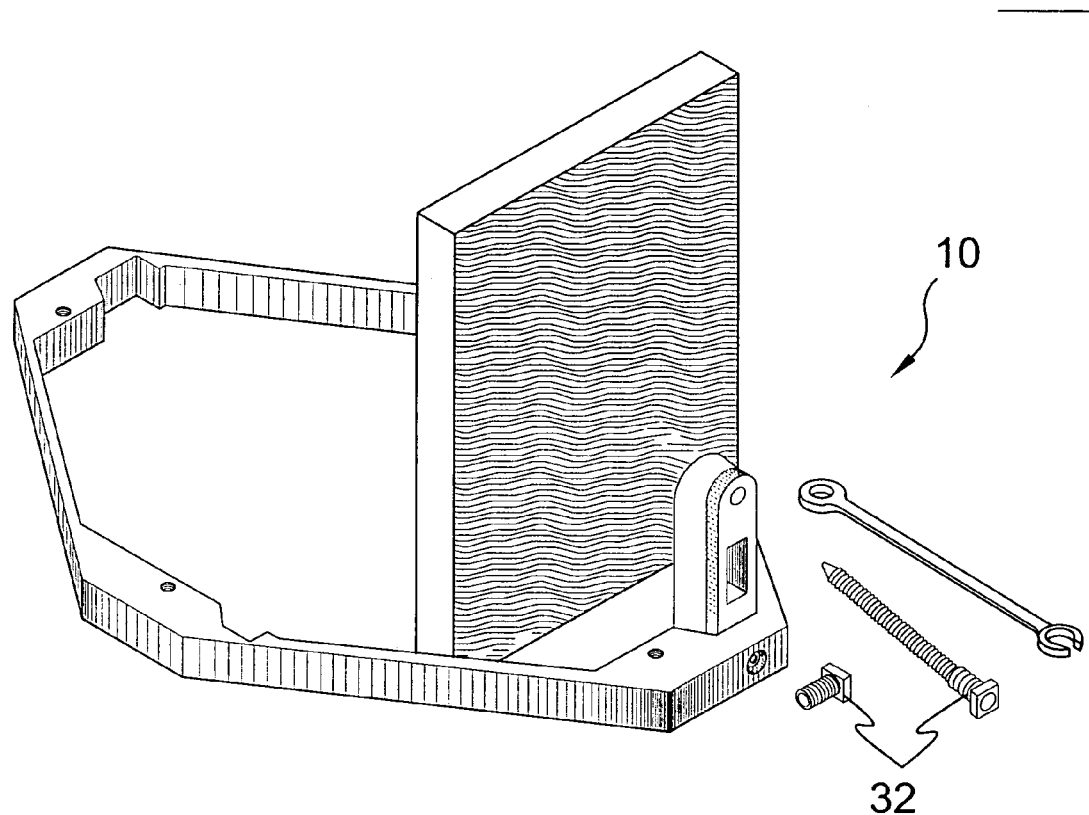
Figure 13:
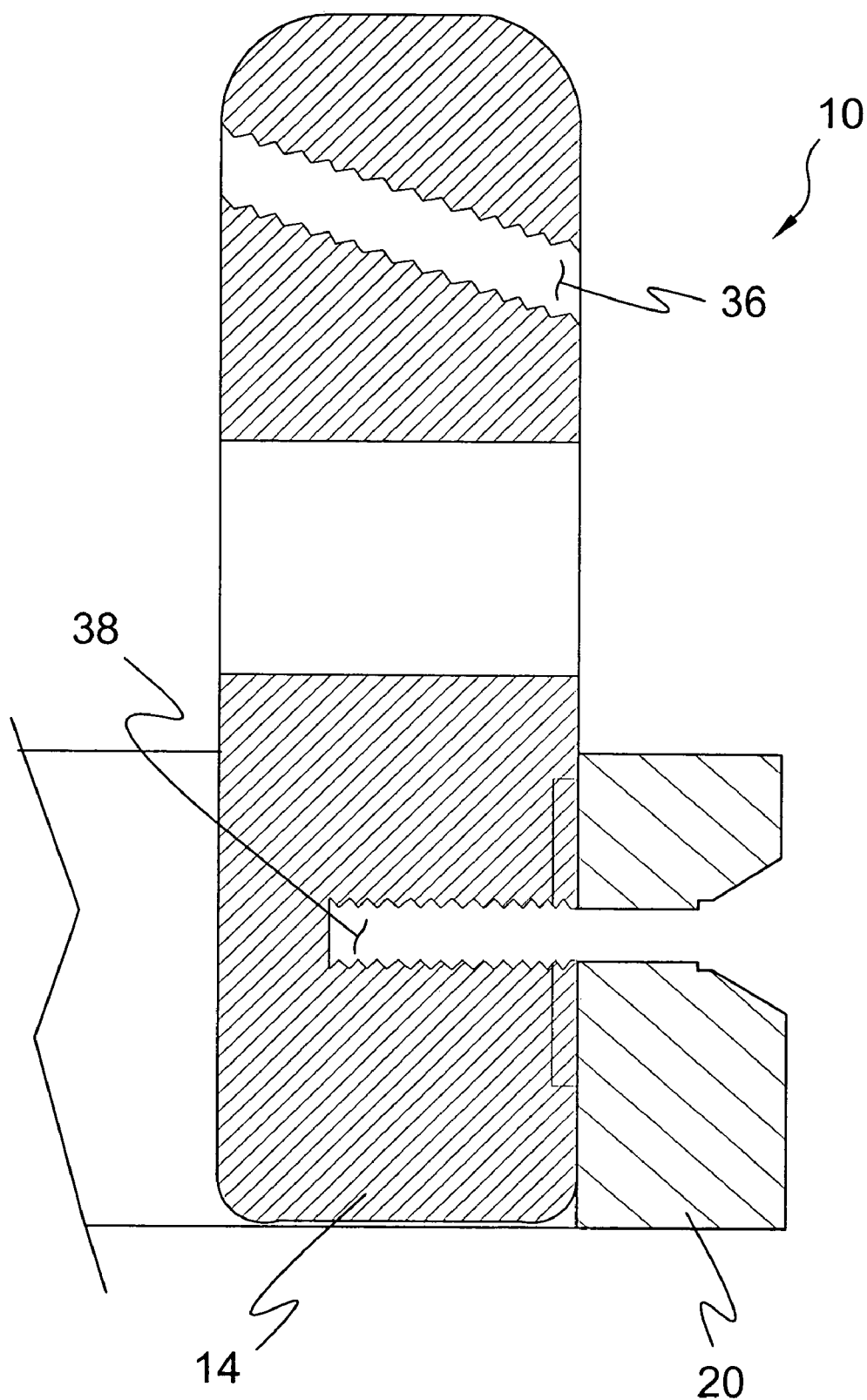
Figure 14:
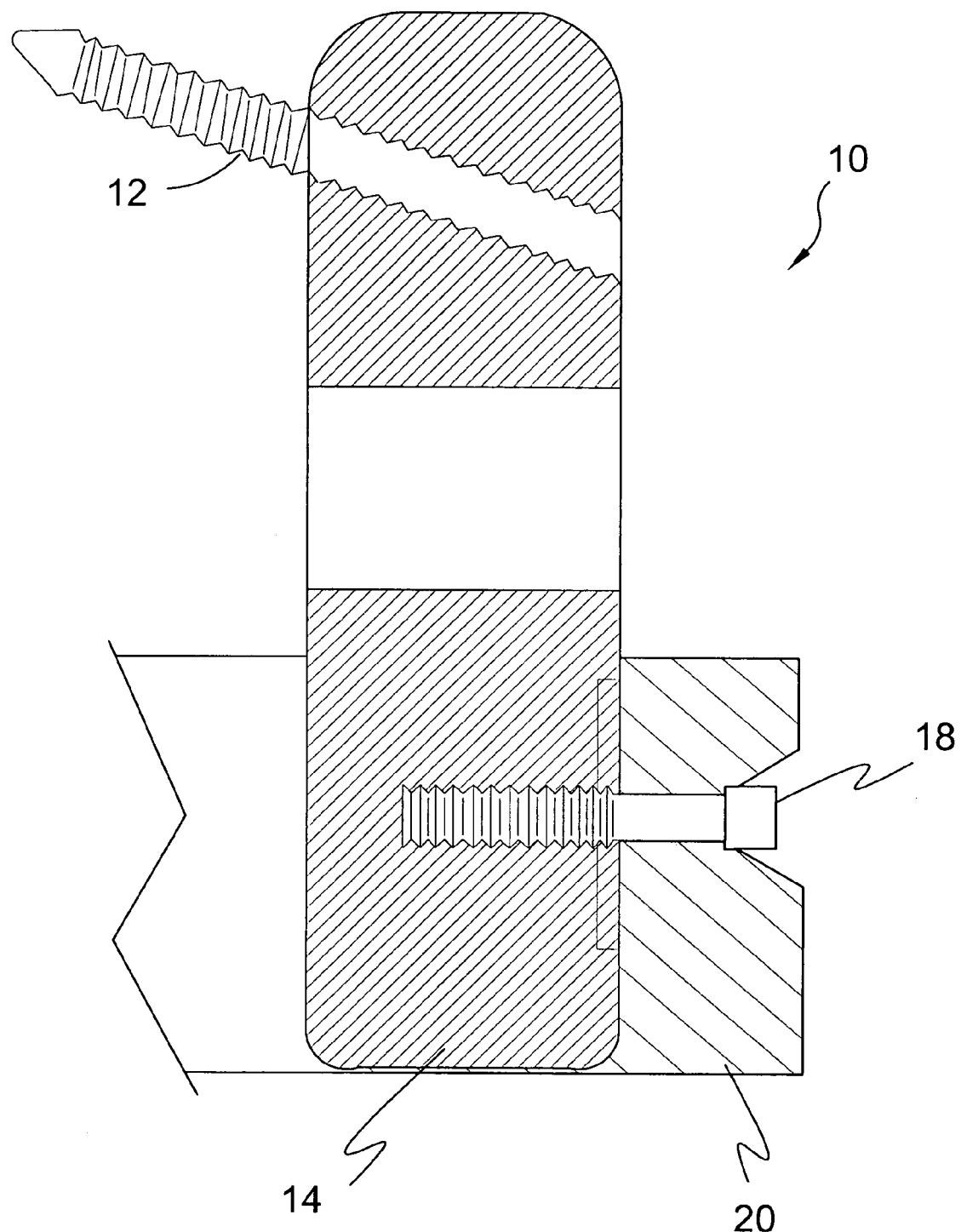

In order that the invention may be more fully understood, it will now be described, by way of example, with reference to the accompanying drawing in which:

FIG. 1 is an illustrated view of the present invention and methods;

FIG. 2 is an illustrated view of the present invention;
FIG. 3 is an illustrated view of the present invention;
FIG. 4 is an illustrated view of the present invention;
FIG. 5 is an illustrated view of the present invention;
FIG. 6 is an illustrated view of the present invention;
FIG. 7 is an illustrated view of the present invention;
FIG. 8 is an illustrated view of the present invention;
FIG. 9 is an illustrated view of the present invention;
FIG. 10 is an illustrated view of the present invention;
FIG. 11 is an illustrated view of the present invention;
FIG. 12 is an illustrated view of the present invention;
FIG. 13 is a sectional view of the present invention; and
FIG. 14 is a sectional view of the present invention.

DESCRIPTION OF THE REFERENCED NUMERALS

Turning now descriptively to the drawings, in which similar reference characters denote similar elements throughout the several views, the figures illustrate the Disposable Set Screw System of the present invention. With regard to the reference numerals used, the following numbering is used throughout the various drawing figures.

10 Disposable Set Screw System of the present invention
12 set screw
14 supporting structure
16 work piece
18 anchoring screw
20 fixture
22 nut
24 cutting tool
26 excess length of 12
28 wrench
30 anchoring screw tool
32 threaded reducer
34 square nut of 32
36 threaded recess for 12
38 threaded recess for 18

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrated view of the present invention 10 and methods. The present invention 10 is a method of employing a set screw 12 comprising inserting the set screw 12 to the desired depth, removing the excess shank portion and means for removal of the set screw 12 when desired. Said means including creating a set screw 12 head using one or more nuts or a threaded reducer, which are advanced through a guide called a supporting structure 14 to engage the work piece 16 within a fixture 20 once the set screw 12 is advanced to the desired position and the excess set screw 12 shank is removed thereby creating a set screw 12 head and using an anchoring screw 18 to relieve the pressure upon the set screw when removal is desired.

FIG. 2 is an illustrated view of the present invention 10. There are three methods used for releasing a set screw 12 when no longer needed. The illustration shows the anchoring screw 18 retaining the supporting structure 14 against the fixture 20 and the set screw 12 in place with a single nut 22. Two nuts 22 can be used to tighten against each other to lock in place.

FIG. 3 is an illustrated view of the present invention 10. The illustration shows the anchoring screw 18 retaining the supporting structure 14 against the fixture 20 with the work piece 16 in place therein and the set screw 12 in place. A cutting tool 24 is used to remove the excess length 26 of the set screw 12. This prevents the excess length 26 from interfering with the assembly in other parts of the process.

FIG. 4 is an illustrated view of the present invention 10. The illustration shows the anchoring screw 18 retaining the supporting structure 14 against the fixture 20 with the work piece 16 in place therein and the set screw 12 in place. The cutting tool 24 was used to remove the excess length 26 of the set screw 12. This prevents the excess length 26 from interfering with the assembly in other parts of the process. The nut 22 acts as a head for the set screw 12 for backing the set screw 12 out when not required anymore.

FIG. 5 is an illustrated view of the present invention 10. A wrench 28 is used to remove the set screw 12 using the nut 22 as a new head for turning the set screw 12.

FIG. 6 is an illustrated view of the present invention 10. The illustration shows the set screw 12 was placed without a nut. The supporting structure 14 that the set screw 12 goes through is removeably attached to the fixture 20, in this case with the anchoring screw 18.

FIG. 7 is an illustrated view of the present invention 10. The supporting structure 14 is released from the fixture 20 using an anchoring screw tool 30.

FIG. 8 is an illustrated view of the present invention 10. The supporting structure 14 is released from the fixture 20 by using the anchoring screw tool 30 to remove the anchoring screw 18. The supporting structure 14 is released from the fixture 20 to remove the set screw 12 therefrom. This is the most commonly used method.

FIG. 9 is an illustrated view of the present invention 10. Another way to release the set screw 12 is by using a threaded reducer 30 that has an end designed for removal with a tool. In this case, it is a square nut 32. The threaded reducer 30 is inserted into the support structure 14. The set screw 12 is then tightened through the threaded reducer 30 and the excess cut off.

FIG. 10 is an illustrated view of the present invention 10. Using the wrench 28, the threaded reducer 32 is loosened.

FIG. 11 is an illustrated view of the present invention 10. Using the wrench, the threaded reducer 32 is loosened and removed from the support structure 14 in the fixture 20 to release the set screw 12.

FIG. 12 is an illustrated view of the present invention 10. The threaded reducers 32 can be disposable or reusable.

FIG. 13 is a sectional view of the present invention 10. Shown is a sectional view of the present invention 10, a method of employing a set screw comprising inserting the set screw to the desired depth, removing the excess shank portion and means for removal of the set screw when desired. Said means including creating a set screw head using one or more nuts or threaded reducer, which are advanced to engage the workpiece once the set screw is advanced to the desired position and the excess set screw shank is removed thereby creating a set screw head and using an anchoring screw to relieve the pressure upon the set screw when removal is desired. Depicted in the illustration is the supporting structure 14 in place against the fixture 20. The supporting structure 14 has a threaded set screw recess 36 extending completely therethrough and a threaded anchoring screw recess 38 extending partially therethrough.

FIG. 14 is a sectional view of the present invention 10. Shown is a sectional view of the present invention 10, a method of employing a set screw 12 comprising inserting the set screw 12 to the desired depth, removing the excess shank portion and means for removal of the set screw 12 when desired. Said means including creating a set screw 12 head using one or more nuts or threaded reducer, which are advanced to engage the workpiece once the set screw 12 is advanced to the desired position and the excess set screw 12 shank is removed thereby creating a set screw 12 head and using an anchoring screw 18 to relieve the pressure upon the set screw 12 when removal is desired. The anchoring screw 18 secures the supporting structure 14 to the fixture 20.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A disposable set screw system designed to achieve a specific length set screw protruding from a work piece regardless of how far said set screw in threaded therein, said set screw system comprising:
 a) a framework forming a fixture retaining a work piece having at least one threaded recess extending therethrough;

b) a supporting structure attached to said fixture through the use of an anchoring screw extending through said threaded recess into said supporting structure, said supporting structure being immovable on said fixture;

c) a set screw that is intentionally longer than needed with a head for driving the set screw, said set screw threaded through a threaded opening in said support structure;

d) means comprising a cutting tool having at least one handle and at least one cutting edge for removing excess length of the set screw after said set screw is set, which removes at least the head of the set screw; and e) said supporting structure thereby being a secondary means of removing said set screw when said set screw is no longer needed.

2. A disposable set screw system as recited in claim 1, wherein said supporting structure is a block bolted to said fixture whereby unbolting of said block from the fixture allows removal of said set screw.

3. A disposable set screw system as recited in claim 1, wherein said secondary means comprises said threaded opening having a larger diameter than said set screw, a threaded reducer with a head adapted for removal being threaded into said threaded opening with said threaded reducer having a threaded throughbore for receiving said set screw for removing said set screw using the head of the threaded reducer.

4. A disposable set screw system as recited in claim 1, said secondary means comprises a mating nut threaded onto said set screw beyond said excess length, said mating nut allowing removal of the set screw by rotating the mating nut which binds on the set screw threads therein unthreading the set screw along with the mating nut.

5. A disposable set screw system as recited in claim 1, wherein said secondary means comprises a pair of mating inner and outer nuts threaded onto said set screw beyond said excess length, providing a secondary set screw head for removing the set screw by rotating the inner nut which binds on the outer nut and therein unthreading the set screw along with the secondary set screw head.

\* \* \* \* \*